United States Patent [19]
Morris et al.

[11] Patent Number: 5,111,837
[45] Date of Patent: May 12, 1992

[54] PRESSURE/THERMAL RELIEF VALVE FOR FUEL TANK

[75] Inventors: John M. Morris, Auburn; Charles E. Stephens, Kent; Alan K. Forsythe, Vashon, all of Wash.

[73] Assignee: GT Development Corporation, Tukwila, Wash.

[21] Appl. No.: 731,530

[22] Filed: Jul. 17, 1991

[51] Int. Cl.⁵ ............................................. F16K 17/36
[52] U.S. Cl. ........................................ 137/72; 137/74
[58] Field of Search .................. 137/15, 43, 72, 73, 137/74

[56] References Cited

U.S. PATENT DOCUMENTS

| | | | |
|---|---|---|---|
| 1,686,875 | 10/1928 | Nelson et al. | |
| 1,724,878 | 8/1929 | Jensen | |
| 2,271,786 | 2/1942 | Watkins | 137/53 |
| 2,375,832 | 5/1945 | Tyden | 169/39 |
| 2,489,787 | 11/1949 | Knowlton | 220/89 |
| 3,040,764 | 6/1962 | Feinberg | 137/73 |
| 3,289,686 | 12/1966 | Tyer, Jr. | 137/73 |
| 4,325,398 | 4/1982 | Green | 137/39 |
| 4,457,325 | 7/1984 | Green | 137/39 |
| 4,458,711 | 7/1984 | Flider | 137/71 |
| 4,487,215 | 12/1984 | Green | 137/43 |
| 4,732,188 | 3/1988 | Gabrlik et al. | 137/73 |
| 4,744,382 | 5/1988 | Visudi et al. | 137/74 X |
| 4,796,777 | 1/1989 | Keller | 220/203 |
| 4,886,089 | 12/1989 | Gabrlik et al. | 137/202 |
| 5,027,844 | 7/1991 | Forsythe et al. | 137/43 |

Primary Examiner—John C. Fox
Attorney, Agent, or Firm—Joan H. Pauly; Delbert J. Barnard

[57] ABSTRACT

A poppet valve structure has a valve plug biased inwardly to close a vent opening (10). A connector member (40, 58) includes a cage (40) extending inwardly from the valve plug and a separately formed bottom plate (58) secured to the cage (40). The plate (58) defines a radially outwardly opening recess (64) and a first pair of axially spaced apart confronting surfaces. A spring abutment member (66) surrounds the plate (58) and defines a radially inwardly opening recess (74) and a second pair of confronting surfaces. The two pairs of surfaces confront and substantially contact each other. The recesses (64, 74) together define a substantially closed annular chamber. The chamber may be formed by a pair of confronting channels (64, 74) or defined axially between two flanges (61, 67) on the plate (58') and the abutment member (66'), respectively. A ring of fusible material (76) is cast in situ within the chamber to interconnect the plate (58) and the abutment member (66). At elevated temperatures, the fusible material (76) melts to allow the plate (58) and abutment member (66) to slide relative to each other and the plug to move outwardly away from the vent opening. The valve may be incorporated into a fuel tank cap.

14 Claims, 4 Drawing Sheets

PRESSURE/THERMAL RELIEF VALVE FOR FUEL TANK

DESCRIPTION

1. Technical Field

This invention relates to pressure relief valves and, more particularly, to such a valve in a fuel tank cap which has an inwardly biased valve plug and stem for pressure relief; said stem having two portions that are connected together by an essentially enclosed body of fusible material which melts at elevated temperatures to allow the stem portions to slide relative to each other and the plug to move away from the valve seat.

Fuel tanks on vehicles are subject to a number of safety requirements These requirements include a venting system for relieving pressure in the tank when such pressure exceeds a predetermined level and a thermal relief system for preventing explosions when the temperature in the tank becomes excessive.

One known type of venting system is a pressure relief valve having a valve plug that is positioned outwardly of a vent opening in the valve housing and is spring biased to close the opening. A valve stem is attached to the plug and extends carries a spring abutment for one end of a compression spring. The other end of the spring abuts the valve housing around the vent opening The spring is calibrated to allow the valve plug and stem to move outwardly to relieve pressure when the pressure exceeds a predetermined level and to reseat the valve plug to close the vent opening when the pressure drops back down to an acceptable level This valve arrangement has the advantages of simplicity of construction, reliability, and low cost.

One approach to providing thermally activated pressure relief is the use of a fusible material that melts at elevated temperatures to cause a vent opening or openings to be uncovered. The fusible material may itself be the cover for the opening, or it may be used to attach a nonfusible material cover to another portion of the venting structure. The latter arrangement has the advantages of allowing a relatively large opening to be uncovered very quickly and of requiring only small amounts of fusible material.

The separate provision of a pressure relief valve and thermal relief based on the melting of fusible material tends to complicate the overall structure of a safety system. Forming the stem from inner and outer portions which are held together by a fusible material permits the system's structure to be simplified. A problem with this approach is that the stem in such a valve arrangement is subjected to significant tension forces by the biasing means, proportional to the amount of pressure required to activate the valve to vent the tank. Known fusible materials that are practical for use in a tank thermal relief system do not have sufficient strength to maintain their structural integrity at realistic venting pressures. Therefore, fusible materials are not practical for use as a direct load-carrying link in a valve stem.

The problem of the relatively low strength of fusible materials can be mitigated by positioning a fusible element in the stem structure between the two stem portions in a manner that isolates it from direct tension forces. For example, a ring of fusible material may be positioned to extend into aligned grooves in the two portions. In this arrangement, the fusible ring carries mostly shear forces, rather than direct tension forces. Failure of the stem structure due to tensile failure of the fusible ring is thereby avoided. However, the durability of the stem structure is compromised because of the tendency of the fusible material to creep when it is subjected to significant pressure. Long-term creeping of the material can cause it to move outwardly from the aligned grooves and thereby weaken the connection between the stem portions.

Another solution to the problem of the relatively low strength of fusible materials is disclosed in U.S. Pat. No. 4,732,188, granted March 22, 1988, to Z. Gabrlik et al., and assigned to the assignee of the present application. This solution is to arrange the inner and outer portions of the stem in a mechanically interlocking, load-transmitting position and to use the fusible material to maintain the stem portions in this position. The fusible material is positioned in such a manner that it is not subjected to any significant axial forces but, rather, carries mainly radial loads In two embodiments disclosed in the patent, fusible material plugs extend radially through adjacent aligned openings in the inner and outer portions of the stem to hold the inner and outer portions together In a third embodiment, the inner portion is formed of two legs, and the fusible material is positioned radially between the two legs.

U.S. Pat. No. 4,796,777, granted January 10, 1989, to R. D. Keller, discloses a vented fuel tank oap and valve assembly. This apparatus includes a main valve member that is biased inwardly to close a main vent opening. A tubular valve cage member extends inwardly from the main valve member and has a float positioned therein A spring retainer plate is attached to the inner end of the cage member by a fusible ring. The the ring fits so that it is clamped between the cage member and an upwardly-projecting inner flange on the retainer plate. The retainer plate apparently has a shallow groove which aligns with the groove on the cage member. Axially inwardly of the fusible ring, the retainer plate curves axially inwardly and radially outwardly away from the ring.

DISCLOSURE OF THE INVENTION

A subject of the invention is an improved relief valve for a fuel tank. The valve is of a type having a vent opening surrounded by an outwardly directed valve seat and an inwardly directed spring abutment surface. A valve plug is positioned outwardly of the valve seat and includes a closure surface directed toward the valve seat. A connector member extends inwardly from the valve plug through the vent opening and has an inner end spaced from the spring abutment surface. A spring abutment member surrounds the inner end of the connector member. A coil spring has an outer end in contact with the spring abutment surface and an inner end in contact with the spring abutment member. A ring of fusible material interconnects the inner end of the connector member and the spring abutment member. According to an aspect of the invention, the improvement comprises a radially outwardly opening recess and a first pair of axially spaced apart confronting surfaces defined by the connector member at its inner end. The spring abutment member defines a radially inwardly opening recess and a second pair of axially spaced apart confronting surfaces. The first pair of confronting surfaces confronts and substantially contacts the second pair. The recesses together define a substantially closed annular chamber. The ring of fusible material is cast in situ within the chamber.

A preferred feature of the invention is a connector member that includes a first portion and a separately formed second portion. The first portion extends inwardly from the valve plug. The second portion defines the radially outwardly opening recess and the first pair of confronting surfaces. The first and second portions are secured together. This preferred feature allows the valve to be more easily assembled The spring abutment member by injecting molten fusible material into the chamber and allowing it to harden before the first and second portions of the connector member are secured together. This allows the casting process to be completed before there is any spring force exerted on the spring abutment member.

Another preferred feature of the invention is the inclusion of first and second pairs of axially spaced apart flanges on the connector member and the spring abutment member, radially outwardly opening channel. The second pair of flanges defines therebetween a radially inwardly opening channel. The first and second pairs of flanges include, respectively, the first and second pairs of confronting surfaces. The recesses comprise the channels, and the channels together define the chamber This preferred arrangement provides a strong and reliable interconnection between the connector member and the spring abutment member. It also permits complete separation of the connector member and the spring abutment member when the fusible material melts, to maximize the effective size of the vent opening and thereby maximize the thermally activated pressure relief.

The two-channel feature described above is generally preferred. However, the structure of the thermal joint may also take other forms. In one alternative embodiment, the connector member has a radially outwardly extending flange, and the spring abutment member has a radially inwardly extending flange. The flanges are axially spaced apart to define an axial extent of the chamber. The flanges are axially slidable relative to each other and at least partially axially aligned, to allow the flanges to slide together into an abutting relationship when the fusible material melts This arrangement has the advantage of allowing the spring to be calibrated to continue to provide fuel containment capability after the fusible material melts It also is relatively easy and inexpensive to manufacture.

An optional feature of the invention is the provision of a normally open second vent opening in the valve plug and the inclusion in the first portion of the oonneotor member of a float valve for closing the second vent opening. This feature provides day-to-day venting under normal conditions of relatively low pressure in the tank, as well as the relief provided by the valve plug in response to higher pressures and the thermally responsive relief provided by the fusible interconnection between the connector member and the spring abutment member. In addition, the float valve helps prevent spillage of liquid from the tank.

Another subject of the invention is an improvement in a fuel tank cap having the characteristics of the type of relief valve described above. The basic and preferred features of the improvement in the cap are essentially the same as those of the improvement in the relief valve, as described above, except that these features are provided in combination with a fuel tank cap.

The improvement of the invention provides a relatively simple solution to the problem of forming a fusible link in a spring biased valve stem structure that is strong enough to withstand the forces imposed by the biasing means and resistant to weakening, such as by long-term creeping. The casting of the fusible material in situ and the enclosing of the cast fusible material in a substantially closed chamber work together to provide a strong and reliable fusible link between the connector member and spring abutment member of the stem structure. In addition to its structural simplicity and high degree of reliability, the fusible interconnection is very versatile and may be used on various types of valve stem structures, including both structures with a secondary vent opening and float valve and those without. In the improvement of the invention, the fusible connection is located at the inner end of the connector member and, thus, is exposed directly to temperatures inside the fuel tank. This positioning of the fusible material makes it sensitive to internal tank temperatures, rather than to temperatures external to the tank. Therefore, thermally activated relief is provided when, and only when, it is actually needed.

These and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

The drawings show two embodiments of a pressure relief valve that are constructed according to the invention and that also constitute the best modes of the invention currently known to the applicants. In the drawings, the valve of the invention is shown incorporated into a cap 2 for closing a fuel tank filling and venting tube. It is anticipated that the valve of the invention will be used primarily by incorporating it into caps for closing fuel tank filling and venting tubes, and more specifically in caps of the type shown in the drawings However, it is of course to be understood that the valve of the invention may also be used to advantage in other types of caps and in other types of installations separate from such caps.

Figures 1, 1A:
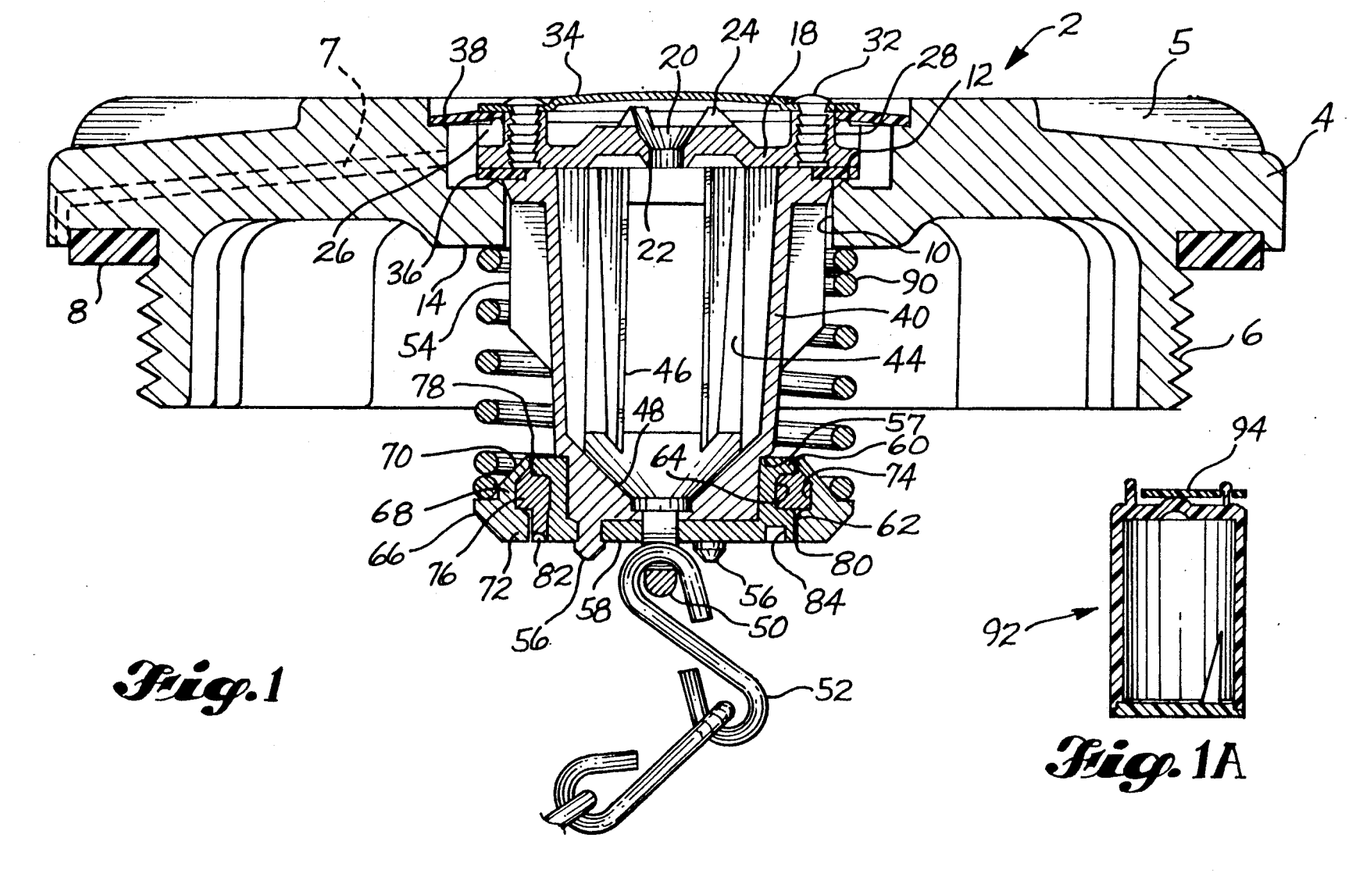
FIG. 1 is a sectional view of the preferred embodiment of the invention, excluding the float.
FIG. 1A is a sectional view of the preferred embodiment of the float for use in the oap and valve structure shown in FIG. 1.

The cap 2 shown in FIG. 1 includes a main body 4 with a central axial opening 10. The opening 10 is a vent opening for relieving excess pressure in the tank. As shown, the outer circumferential surface of the body 4 has external threads 6 formed thereon for engaging an internally threaded filler tube The body 4 could also be provided with internal threads for engaging externally threaded filler tubes. The outer surface of the body 4 has recesses 5 formed thereon to facilitate gripping the body 4 when it is being attached to or detached from a filler tube. When the cap 2 is secured on a tube, a gasket 8 seals the interface between the top of the tube and an inner surface of the cap body 4.

The pressure relief valve of the invention includes a valve plug positioned outwardly of the axial opening 10 in the oap body 4, and a stem extending axially inwardly from the plug through the opening 10. Referring to FIG. 1, the valve plug of the preferred embodiment includes a poppet plate 18 and a cover disk 34 which is secured to the plate 18 The stem includes a connector member 40, 58 attached to and extending axially inwardly from the valve plug, and a spring abutment member 66. The connector member 40, 58 includes a cage portion 40 attached to the poppet plate 18, and an axially inner bottom plate 58. A coil spring 90 is positioned with its outer end abutting the inwardly directed spring abutment surface 14 of the cap body 4 around the opening 10 and its inner end abutting the spring abutment member 66. The spring 90 exerts an axial, inward bias the valve plug into a position in which it closes the opening 10.

The poppet plate 18 is generally disk-shaped and has a raised center portion through which a vent opening 20 extends axially. An inwardly directed valve seat 22 surrounds the inner end of the opening 20. Three triangular spacers 24 extend axially outwardly from the outer radial surface of the plate 18 around the outer end of the opening 20. The outer radial surface of the plate 18 may also have a plurality of circumferentially-spaced, axially projecting, radially disposed spacers 26. Preferably, at least some of these spacers 26 extend radially inwardly only along a peripheral portion of the plate surface to facilitate flow of fuel vapors along the radial surface and around the vent opening 20. The upper radial surface of the plate 18 also has two lugs 28 formed thereon for receiving fasteners 32 for attaching the cover disk 34 to the plate 18. The fasteners may be of any suitable type, such as the drive pins 32 shown in FIG. 1. The spacers 24, 26 and the lugs 28 function to maintain the cover disk 34 spaced axially outwardlY from the outer radial surface of the poppet plate 18 to ensure free flow of vapor and proper venting of the tank. The radial spacers 26 also provide a resting place for a cover gasket 38 that sealingly engages the inner peripheral surface of the cover disk 34 and an outwardly facing radial shoulder formed on the cap body 4. A poppet gasket 36 is carried by the plate 18 and the cage 40. When the valve plug is in its normal closed position shown in FIG. 1, the gasket 36 sealingly engages an outwardly directed valve seat 12 formed on the cap body 4 and surrounding the axial opening 10.

The open top of the cage 40 is closed by the poppet plate 18 to which the cage 40 is secured and from which the cage 40 extends axially inwardly. The two members 18, 40 may be secured together in various ways For example, the upper annular radial surface of the cage 40 may have circumferentially spaced pins (not shown) formed thereon and projecting axially therefrom. During assembly of the valve, the pins are received into aligned holes extending through the poppet plate 18. The outer ends of the pins are then upset to form rivet-like heads to secure the cage 40 to the plate 18.

A float 92 (FIG. 1A) is positioned in the cage 40 and caries a valve element 94 for sealingly engaging the valve seat 22 around the vent opening 20 when the liquid level in the cage 40 rises, such as when the fuel in the tank sloshes or the tank is in an overturned position. The seating of the valve element 94 prevents liquid fuel from exiting the oap 2 through the vent opening 20. The float 92 preferably has substantially the same configuration as the float shown in U.S. Pat. No. 4,886,089, granted Dec. 12, 1989, to Z. Gabrlik et al. and assigned to the assignee of the present application. The cage 40 has three circumferentially spaced openings 44 extending radially therethrough to allow free fluid flow into and out from the interior of the cage 40. The inner circumferential surface of the cage 40 has a plurality of axially extending ribs 46 projecting radially therefrom to guide movement of the float 92 in the cage 40. The radial extent of the ribs 46 is sufficient to prevent liquid surface tension from holding the float 92 up when the liquid level in the cage 40 falls The upper portion of the cage 40 has a plurality of axially extending, radially projecting guides 54.

The bottom of the cage 40 forms a frustoconical inner surface 48. A weighted ball (not shown) is positioned in the cage 40 between the frustoconical surface 48 and the float 92 and functions in a known manner to seat the float 92 when the valve is in an overturned position An eye 50 is formed on the bottom end of the cage 40 to provide means for attaching a chain 52 to the cage 40. The other end of the chain 52 is attached to a known type of chain stay (not shown) to prevent the oap 2 from being completely detached from the tube on which it is installed and thereby prevent its loss.

The cap 2 has a passageway 7 for communicating the vent opening 20 with the exterior of the body 4. The passageway 7 extends radially and downwardly from a center portion of the cap body 4 to the exterior inwardly facing radial surface of the cap body 4. Preferably, a plurality of circumferentially spaced passageways 7 are provided The inner end of each passageway 7 is in open communication with an outer extension of the axial opening 10 between the gaskets 36, 38. This portion of the opening 10 is, in turn, in open communication with the vent opening 20 via the space between the poppet plate and the cover disk 34. Thus, under normal conditions, air and vapors freely flow into and out from the tank through the vent opening 20, along the outer radial face of the poppet plate 18 between the spacers 24, 26, and through the extension of the opening 10 and passageways 7.

The cap and valve structure described above is substantially the same as that disclosed in copending application Ser. No. 07/256,911, filed Oct. 12, 1988 and assigned to the assignee of the present application. The major differences between the valve disclosed in the copending application and the valve of the present application are in the structure of the lower portion of the valve stem and the thermal joint included therein. The present invention is directed toward these portions of the valve stem structure.

As noted above, in the valve structure shown in the drawings, the connector member 40, 58 includes a cage portion 40, and a bottom plate 58. The two-part construction of the connector member 40, 58 facilitates the assembly of the valve, as described above. The securing together of the cage portion 40 and the base plate 58 is preferably the final stage of the assembly of the valve stem. The bottom radial surface of the cage 40 has a plurality of circumferentially spaced projections extending axially inwardly therefrom. In the preferred embodiment shown in the drawings, there are three evenly spaced projections. The bottom plate portion 58 of the connector member 40, 58 has three holes 59 for receiving the projections on the bottom of the cage 40. In the final stage of assembly, the bottom plate 58 is positioned on the bottom of the cage 40 with the projections extending through the holes 59. An annular shoulder 57 formed by the cage 40 and a locator recess 84 in the bottom plate 58 help guide placement of the base plate 58. When the plate 58 is in position, the outer ends of the projections are upset to form rivet-like heads 56 and secure the plate 58 to the cage 40.

Prior to the securing of the bottom plate 58 to the cage 40, the bottom plate 58 is connected to the spring abutment member 66. The bottom plate 58 has a radially outwardly opening recess 64 formed thereon and a first pair of axially spaced apart confronting surfaces Similarly, the spring abutment member 66 defines a radially inwardly opening recess 74 and a second pair of axially spaced apart confronting surfaces In the preferred embodiment shown in FIGS. 1-6, each of the recesses 64, 74 takes the form of a channel defined axially between a pair of axially spaced apart flanges The bottom plate 58 has an upper flange 60 and a lower flange 62 which define a radially outwardly opening channel 64. The spring abutment member 66 has a lower flange 72 and an axially outwardly extending projection 68. The axially outer portion of the projection 68 is crimped radially inwardly to form an upper flange 70. The forming of the upper flange 70 by crimping is preferred over machining or casting the upper flange because it is the easiest and most efficient forming procedure. A channel 74 is defined by the crimped portion 70 and the lower flange 72. The adjacent circumferential surfaces of the two pairs of flanges 60, 62 and 70, 72 form the first and second pairs of confronting surfaces, which confront and substantially contact each other. In the assembled valve stem, the adjacent channels 64, 74 together define a substantially 10 closed annular chamber.

As shown, the chamber 64, 74 is substantially rectangular in cross section and extends uninterrupted all the way around the bottom of the stem. The term "annular chamber", as used herein, also includes a chamber with interruptions around its circumference, e.g. a chamber formed by a plurality of separate arcuate subchambers. However, the illustrated continuous chamber 64, 74 is preferred since it generally provides a stronger joint and is more easily injected with molten material.

Figure 2:
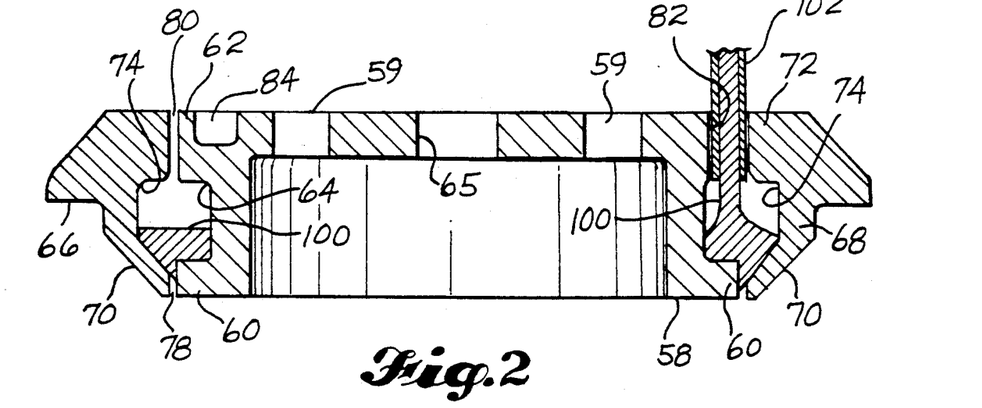
FIG. 2 is a sectional view of the preferred embodiment of the spring abutment member and the inner portion of the connector member, illustrating the injecting of molten fusible material into the chamber formed thereby.
Figure 3:
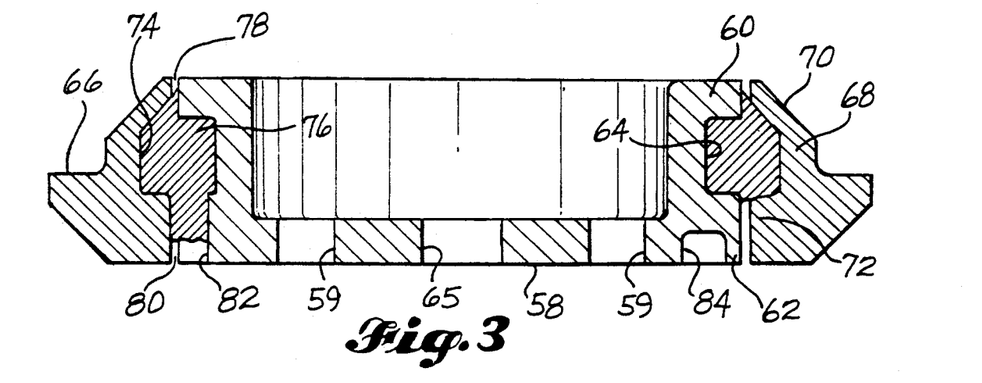
FIG. 3 is similar to FIG. 2 except that it shows the two elements after the injecting and casting procedure has been completed.
Figure 4:
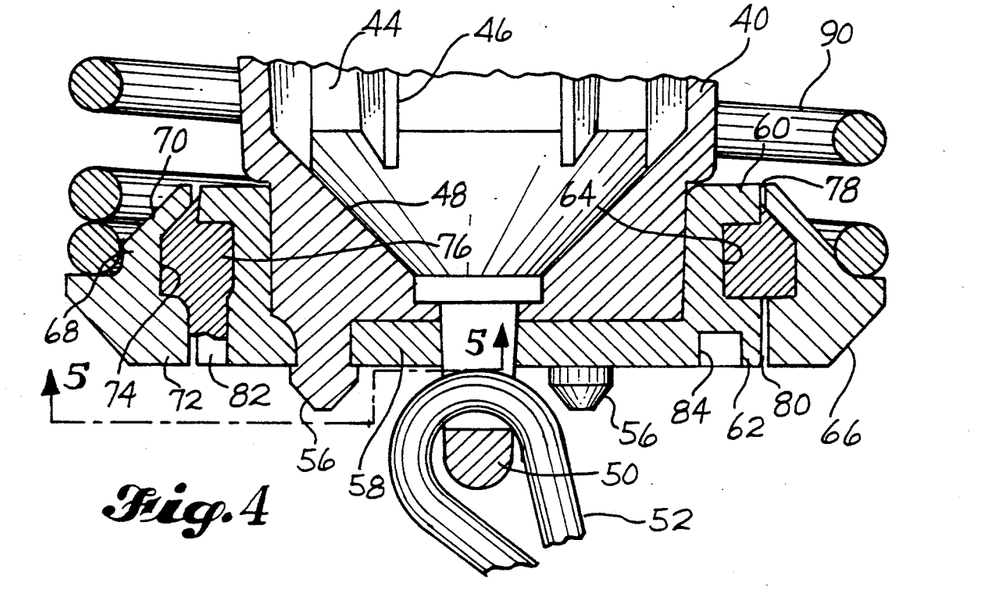
FIG. 4 is an enlarged fragmentary sectional view of the lower end of the fully assembled valve structure shown in FIG. 1.

FIGS. 2 and 3 illustrate the forming of the thermal joint to interconnect the bottom plate 58 and the spring abutment member 66. The interconnection is accomplished by casting a ring of fusible material in situ within the chamber 64, 74. In order to permit the introduction of molten fusible material into the chamber 64, 74, the bottom plate 58 or spring abutment member 66, or these two elements 58, 66 together, form a small passageway leading into the chamber 64, 74. In the preferred embodiment, the bottom plate 58 is provided with a passageway 82 located along the outer circumferential surface of the lower flange 62, as shown in FIGS. 1-5.

Referring to FIG. 2, a nozzle 102 is introduced into the passageway 82 for injecting molten fusible material 100 into the chamber 64, 74. Sufficient molten material 100 is injected to at least substantially fill the chamber 64, 74. After the material 100 is injected, the nozzle 102 is removed and the fusible material is allowed to harden into a solid ring of fusible material 76, as shown in FIG. 3 The cast body 76 of fusible material takes the shape of the chamber 64, 74 to form a strong and reliable joint between the plate 58 and spring abutment member 66. After the body of fusible material 76 has completely hardened, the assembly formed by the interconnected bottom plate 58 and spring abutment member 66 is joined to the cage 40, as described above and shown in FIGS. 1 and 4. As can be seen therein, the eye 50 formed on the bottom of the cage 40 projects through a slot 65 that extends through the bottom plate 58.

Figure 8:
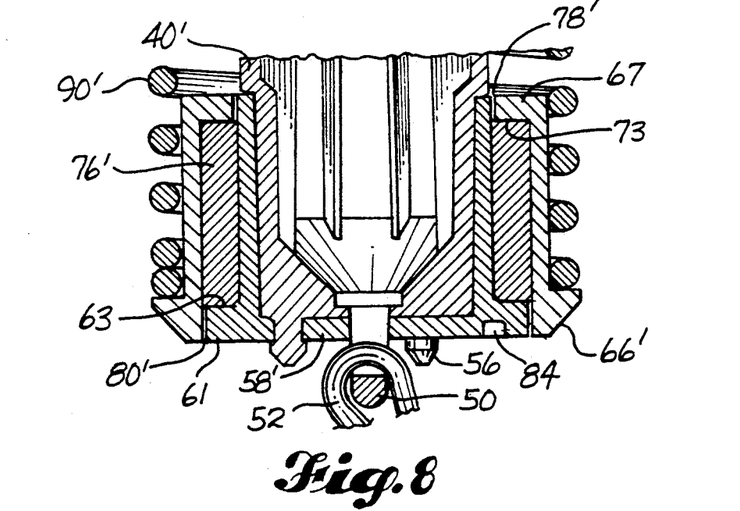
FIG. 8 is an enlarged fragmentary sectional view of an alternate embodiment of the fusible interconnection of the invention.

FIG. 8 shows an alternate embodiment of the invention. In this embodiment, the bottom plate 58' and the spring abutment member 66' each form a single flange. An axially inner or lower flange 61 on the bottom plate 58, extends radially outwardly and defines a recess 63 and the bottom of the substantially enclosed chamber in the assembled structure. An upper flange 67 on the spring abutment member 66' extends radially inwardly and defines a recess 73 and the top of the chamber. Each of the flanges 61, 67 extends into the recess 73, 63 formed on the opposite element 66', 58' and has a circumferential surface that confronts and substantially contacts the circumferential wall of the portion of the recess 73, 63 into which it extends The flanges 61, 67 are axially spaced apart to define the axial extent of a chamber for the the portions of the circumferential walls of the recesses 63, 73 axially between the flanges 61, 67. As in the embodiment shown in FIGS. 1-6, molten fusible material is injected into the chamber 63, 73 and hardens into a fusible body 76' to join the bottom plate 58, and spring abutment member 66' together.

Figure 5:
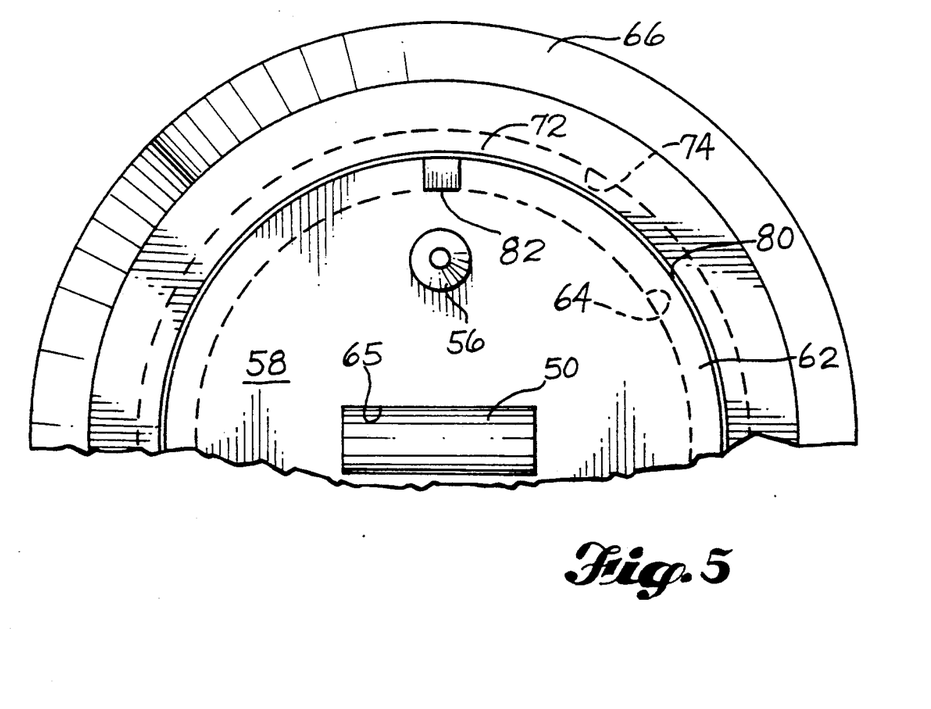
FIG. 5 is a fragmentary bottom plan view of the assembled connector member and spring abutment member shown in FIG. 4, with the chain omitted.
Figure 6:
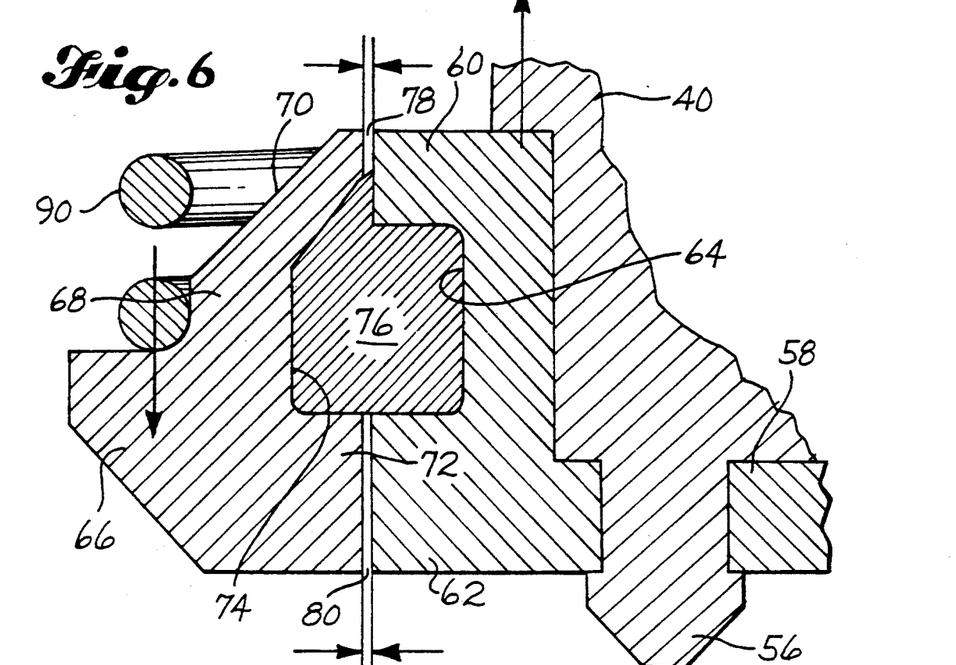
FIG. 6 is an enlarged fragmentary sectional view of a portion of the structure shown in FIG. 4, illustrating the substantially closed nature of the annular chamber.

A major feature of the improvement of the invention is a thermal joint in which two members are joined together by a body of fusible material cast in situ in a substantially closed chamber. Both the substantially closed nature of the chamber and the casting of the fusible material in situ contribute to the resulting high degree of strength and reliability of the joint. The phrase "substantially closed", as used herein, means that any openings or gaps in the walls defining the chamber are sufficiently small and/or narrow so that there will be essentially no creeping of the fusible material 76, 76' into such openings or gaps during the useful life of the valve, as long as the body 76, 76, is not subjected to temperatures at which the fusible material will melt. Thus, the small fill passageway 82 is sufficiently small so that such creeping will not occur. Similarly, as best seen in FIGS. 5 and 6, the gaps 78, 80 between the upper flanges 60, 70 and the lower flanges 62, 72, respectively, are sufficiently narrow so that creeping of the fusible material into the gaps 78, 80 will not occur. In the embodiment shown in FIG. 8, the upper and lower gaps 78', 80' are also sufficiently narrow to prevent creeping. In either embodiment, some molten fusible material may enter the gaps 78, 80 or 78', 80' during the casting process. However, this oozing of the molten fusible material into the gaps does not affect the functioning of the joint, and following the hardening of the functioning of the joint, there is no further movement of the fusible material in the gaps.

In the invention, the gaps between the substantially contacting confronting surfaces are maintained at a minimum width rather than being eliminated, such as by an interference fit. This is necessary since an interference fit would tend to prevent the spring abutment member 66, 66' and the bottom plate 58, 58' from sliding relative to each other when the fusible body 76, 76' melts because of exposure to elevated temperatures. Failure of these two members 58, 58' and 66, 66' to slide relative to each other would in turn prevent the thermally activated pressure relief which the thermal joint is intended to provide, and could lead to danger of explosion. Therefore, the fit of the spring abutment member 66, 66' around the bottom plate 58, 58' is a close tolerance fit with a minimum gap.

Figure 7:
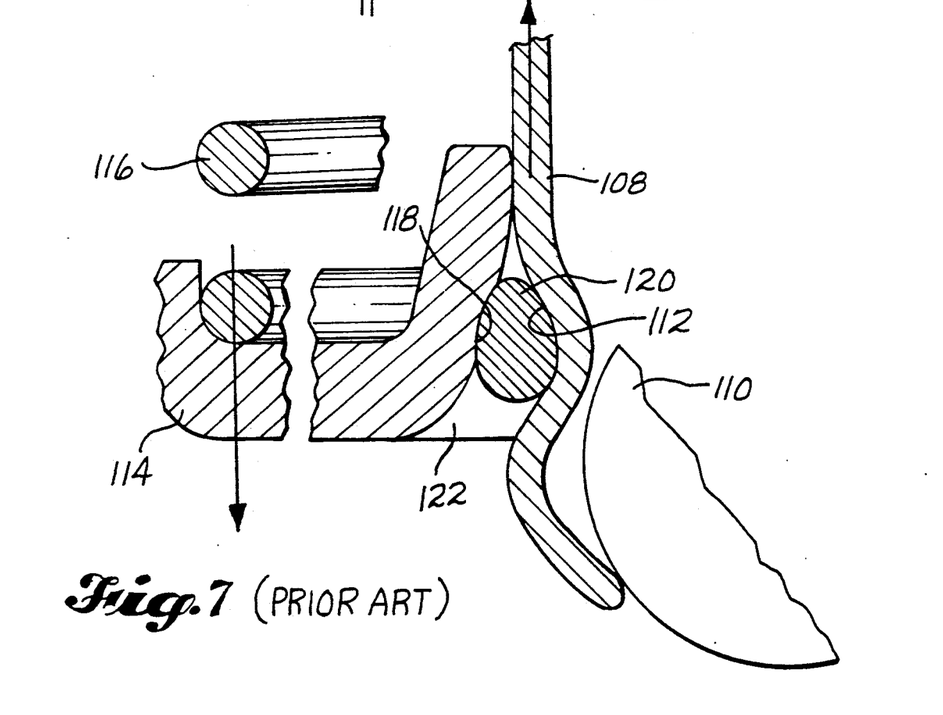
FIG. 7 is the same type of view as FIG. 6 and shows a prior art fusible connection.

For the purpose of comparison, FIG. 7 is a view similar to FIG. 6 showing the structure of the thermal joint disclosed in U.S. Pat. No. 4,796,777, cited above FIG. 7 shows a cage portion 108 of a valve stem structure A weighted ball 110 is positioned in the bottom of the cage 108. A rounded annular groove 112 is formed on the outer circumferential surface of the cage 108. A spring retainer plate 114 surrounds the bottom part of the cage 108 and apparently has a rounded shallow groove 118 formed thereon. A coil spring 116 abuts the retainer plate 114. A fusible ring 120 is positioned between the bottom of the cage 108 and the retainer plate 114 and extends into the annular groove 112 and apparently the aligned shallow groove 118. The upper portion of the retainer plate 114 is shown as abutting the cage 108. However, axially inwardly from the fusible ring 120, the retainer plate 114 curves axially inwardly and radially outwardly away from the ring 120 to form a large annular opening 122 adjacent to the lower end of the ring 120. The opening 122 is nearly as wide as the ring 120.

The valve of the invention shown in FIGS. 1-6 operates in a known manner to vent the tank on which it is installed under normal conditions and to relieve pressure in response to elevated pressure levels in the tank. The venting through the vent opening 20 described above occurs during day-to-day operation of the valve when the tank is upright and the pressure in the tank does not exceed a predetermined magnitude. When the pressure in the tank reaches or exceeds the predetermined magnitude, such as when venting through the vent opening 20 is precluded by seating of the valve element 94, the poppet opens to relieve the pressure. The spring 90 is calibrated to allow the stem and the valve plug to move outwardly away from the opening 10 in the cap body 4 when the pressure in the tank reaches the predetermined magnitude. This provides safety venting to quickly vent the pressure and bring it back down to a safer level The outward movement of the valve plug and stem allows free flow of vapor, or fuel in the case of an overturned condition, out of the cap body 4 around the cage 40 and through the axial opening i0. The annular portion of the opening 10 around the cage 40 provides a relatively large total vent opening area for rapid pressure relief.

During the day-to-day operation of the valve and the safety venting described above, the fusible body 76 holds the bottom plate 58 and the spring abutment member 66 together so that the stem functions as an integral structure. This allows the valve to function in the manner of know types of poppet valves, to normally maintain the valve plug in the closed position shown in FIG. 1 and allow the valve plug to move outwardly in response to an increase in pressure. The stem continues to function as an integral structure as long as the temperature in the tank does not exceed a predetermined level. When the temperature exceeds this predetermined level, the fusible body 76 melts to allow the bottom plate 58 and the spring abutment member 66 to separate When the body 76 melts, the downward force of the spring 90 on the spring abutment member 66 pushes the member 66 axially inwardly to separate it from the connector member 40, 58. This allows the valve plug and the connector member 40, 58 to move axially outwardly away from the opening 10 in the oap body 4 to provide immediate relief of pressure in the tank and thereby prevent an explosion. Since the fusible body 76 is positioned on an axially inner portion of the stem, the melting of the body 76 and the consequent thermally activated pressure relief are directly responsive to temperature in an overturned condition.

The operation of the embodiment shown in FIG. 8 is the same as the operation of the embodiment of FIGS. 1-6, described above, except that the connector member 40', 58' and the spring abutment member 66' do not separate when the fusible body 76, melts. The melting of the body 76' allows the members 40', 58' and 66' to slide axially relative to each other. The force of the spring 90' moves the abutment member 66' axially inwardly and the flange 67 toward the flange 61 on the bottom plate 58'. Since the flanges 61, 67 are axially aligned, they move into an abutting relationship which limits the relative sliding movement of the members 40', 58' and 66'. Although the members 40', 58' and 66' are not separated, the relative movement has the effect of reducing the force of the spring 90' and thereby lowering the pressure level at which the poppet plug moves away from the opening 10. The lengthening of the stem structure also causes the plug to move outwardly a greater distance for a given pressure level and, thereby, create a larger effective vent opening. The configuration of the cage 40' can be modified to maximize the increase in size of the vent opening. The axial distance between the flanges 61, 67 before thermal release is chosen, and the strength of the spring 90' is calibrated, to provide a first predetermined pressure relief setting prior to thermal relief and a second predetermined setting following thermal relief. Preferably, the second setting is very low to provide maximized relief in response to elevated temperatures, but is greater than zero to provide residual containment capability. The residual positive force of the spring 90' will enable it to close the valve plug to contain remaining fuel if the cause of the elevated temperature (the fire) is removed The second setting could also be less than or equal to zero.

The preferred embodiments of the valve of the invention illustrated and described herein may be modified in a number of ways without departing from the spirit and scope of the invention. For example, the normal venting feature may be omitted. This can be accomplished by providing a different ageless connector member and/or a different valve plug without a vent opening, or by simply omitting the float 92 and forming the poppet plate 18 as shown but without the vent opening 20. In the latter structure, the cage and the bottom plate continue to function as the connector member of the invention This manner of constructing a nonventing valve has the great advantage of allowing both venting and nonventing valves to be manufactured from substantially the same parts using substantially the same equipment and procedures.

It will be obvious to those skilled in the art to which this invention is addressed that the invention may be used to advantage in a variety of situations Therefore, it is also to be understood by those skilled in the art that various modifications and omissions in form and detail may be made without departing from the spirit and scope of the invention as defined by the following claims.

What is claimed is:

1. An improved relief valve for a fuel tank, said valve being of a type having a vent opening surrounded by an outwardly directed valve seat and an inwardly directed spring abutment surface, a valve plug positioned outwardly of the valve seat and including a closure surface directed toward the valve seat, a oonneotor member extending inwardly from the valve plug through the vent opening, said connector member having an inner end spaced from the spring abutment surface, a spring abutment member surrounding the inner end of said connector member, a coil spring having an outer end in contact with the spring abutment surface and an inner end in contact with the spring abutment member, and a ring of fusible material interconnecting the inner end of the connector member and the spring abutment member, wherein the improvement comprises:

said connector member defining, at its inner end, a radially outwardly opening recess and a first pair of axially spaced apart confronting surfaces;

said spring abutment member defining a radially inwardly opening recess and a second pair of axially spaced apart confronting surfaces;

said first pair of confronting surfaces confronting and substantially contacting said second pair of confronting surfaces;

said recesses together defining a substantially closed annular chamber; and said ring of fusible material being cast in situ within said chamber.

2. The valve of claim !, in which said connector member includes a first portion that extends inwardly from the valve plug, and a separately formed second portion that defines said radially outwardly opening recess and said first pair of confronting surfaces; said first and second portions being secured together.

3. The valve of claim 2, in which the valve plug has a normally open second vent opening, and said first portion of the connector member includes a float valve for closing said second vent opening.

4. The valve of claim 1, in which said connector member includes a first pair of axially spaced apart flanges defining therebetween a radially outwardly opening channel; said spring abutment member includes a second pair of axially spaced apart flanges defining therebetween a radially inwardly opening channel; said first and second pairs of flanges include, respectively, said first and second pairs of confronting surfaces; said recesses comprise said channels; and said channels together define said chamber.

5. The valve of claim 4, in which said connector member includes a first portion that extends inwardly from the valve plug, and a separately formed second portion that includes said first pair of flanges; said first and second portions being secured together.

6. The valve of claim 5, in which the valve plug has a normally open second vent opening, and said first portion of the connector member includes a float valve for closing said second vent opening.

7. The valve of claim !, in which said ring of fusible material is meltable at elevated temperatures exceeding a predetermined level, said connector member has a radially outwardly extending flange, and said spring abutment member has a radially inwardly extending flange; said flanges being axially spaced apart to define an axial extent of said chamber; and said flanges being axially slidable relative to each other and at least partially axially aligned, to allow said flanges to slide together into an abutting relationship when said ring of fusible material melts.

8. An improved fuel tank oap having a vent opening surrounded by an outwardly directed valve seat and an inwardly directed spring abutment surface, a valve plug positioned outwardly of the valve seat and including a closure surface directed toward the valve seat, a connector member extending inwardly from the valve plug through the vent opening, said connector member having an inner end spaced from the spring abutment surface, a spring abutment member surrounding the inner end of said connector member, a coil spring having an outer end in contact with the spring abutment surface and an inner end in contact with the spring abutment member, and a ring of fusible material interconnecting the inner end of the connector member and the spring abutment member, wherein the improvement comprises:

said connector member defining, at its inner end, a radially outwardly opening recess and a first pair of axially spaced apart confronting surfaces;

said spring abutment member defining a radially inwardly opening recess and a second pair of axially spaced apart confronting surfaces;

said first pair of confronting surfaces confronting and substantially contacting said second pair of confronting surfaces;

said recesses together defining a substantially closed annular chamber; and said ring of fusible material being cast in situ within said chamber.

9. The cap of claim 8, in which said connector member includes a first portion that extends inwardly from the valve plug, and a separately formed second portion that defines said radially outwardly opening recess and said first pair of confronting surfaces; said first and second portions being secured together.

10. The cap of claim 9, in which the valve plug has a normally open second vent opening, and said first portion of the connector member includes a float valve for closing said second vent opening.

11. The cap of claim 8, in which said connector member includes a first pair of axially spaced apart flanges defining therebetween a radially outwardly opening channel; said spring abutment member includes a second pair of axially spaced apart flanges defining therebetween a radially inwardly opening channel; said first and second pairs of flanges include, respectively, said first and second pairs of confronting surfaces; said recesses comprise said channels; and said channels together define said chamber.

12. The cap of claim 11, in which said connector member includes a first portion that extends inwardly from the valve plug, and a separately formed second portion that includes said first pair of flanges; said first and second portions being secured together.

13. The oap of claim 12, in which the valve plug has a normally open second vent opening, and said first portion of the connector member includes a float valve for closing said second vent opening.

14. The oap of claim 8, in which said ring of fusible material is meltable at elevated temperatures exceeding a predetermined level, said connector member has a radially outwardly extending flange, and said spring abutment member has a radially inwardly extending flange; said flanges being axially spaced apart to define an axial extent of said chamber; and said flanges being axially slidable relative to each other and at least partially axially aligned, to allow said flanges to slide together into an abutting relationship when said ring fusible material melts .

* * * * *

UNITED STATES PATENT AND TRADEMARK OFFICE
CERTIFICATE OF CORRECTION

PATENT NO. : 5,111,837  
DATED : May 12, 1992  
INVENTOR(S) : John M. Morris, Charles E. Stephens, and Alan K. Forsythe It is certified that error appears in the above-identified patent and that said Letters Patent is hereby corrected as shown below:

Col. 1, line 16, there is a period after "requirements", first occurrence.

Col. 1, line 25, after "extends", insert -- inwardly therefrom into the tank. The inner end of the stem --.

Col. 1, line 27, there is a period after "opening".

Col. 1, line 32, there is a period after "level".

Col. 2, line 18 there is a period after "loads".

Col. 2, line 21, there is a period after "together".

Col. 2, line 26, "oap" should be -- cap --.

Col. 2, line 30, there is a period after "therein".

Col. 2, line 32, between "The" and "the", insert -- bottom end of the cage member has an annular groove into which --.

Col. 3, line 8, there is a period after "assembled".

Col. 3, line 8, after "The", insert -- second portion of the connector member may be joined to the --.

Col. 3, line 18, after "member,", insert -- respectively. The first pair of flanges defines therebetween a --.

Col. 3, line 23, there is a period after "chamber".

Col. 3, line 45 there is a period after "melts".

UNITED STATES PATENT AND TRADEMARK OFFICE
CERTIFICATE OF CORRECTION

PATENT NO. : 5,111,837

DATED : May 12, 1992

INVENTOR(S) : John M. Morris, Charles E. Stephens, and Alan K. Forsythe

It is certified that error appears in the above-identified patent and that said Letters Patent is hereby corrected as shown below:

Col. 3, lines 49 and 50, "oonneotor" should be -- connector --.

Col. 4, line 31, "oap" should be -- cap --.

Col. 4, line 67, there is a period after "drawings".

Col. 5, line 4, "!0" should be -- 10 --.

Col. 5, line 8, there is a period after "tube".

Col. 5, line 18, "oap" should be -- cap --.

Col. 5, line 19, "!0" should be -- 10 --.

Col. 5, line 22 there is a period after "plate 18".

Col. 5, line 31, after "inward", insert -- force on the abutment member 66 to put the stem in tension and --.

Col. 5, line 52, "outwardlY" should be -- outwardly --.

Col. 5, line 67, there is a period after "ways".

Col. 6, line 13, "oap" should be -- cap --.

Col. 6, line 26, there is a period after "falls".

Col. 6, line 33, there is a period after "position".

Col. 6, line 37, "oap" should be -- cap --.

Col. 6, line 46 there is a period after "provided".

Col. 6, line 51, insert -- 18 -- after "poppet plate"

Col. 7, line 25, there is a period after "surfaces".

Col. 7, line 28, there is a period after "surfaces".

Col. 7, line 31, there is a period after "flanges".

Col. 7, line 47, after "substantially", delete "10".

UNITED STATES PATENT AND TRADEMARK OFFICE
CERTIFICATE OF CORRECTION

PATENT NO. : 5,111,837
DATED : May 12, 1992
INVENTOR(S) : John M. Morris, Charles E. Stephens, and Alan K. Forsythe It is certified that error appears in the above-identified patent and that said Letters Patent is hereby corrected as shown below:

Col. 8, lines 7 and 8, there is a period after "Fig. 3".
Col. 8, lines 22 and 23, "plate 58," should be -- plate 58' --.
Col. 8, line 28, "flanges 6!, 67" should be -- flanges 61, 67 --.
Col. 8, line 32, there is a period after "extends".
Col. 8, line 34, after "the", first occurrence, insert -- fusible material. The radial extent of the chamber is defined by --.
Col. 8, line 38, "plate 58," should be -- plate 58' --.
Col. 8, line 52, "body 76, 76," should be -- body 76, 76' --.
Col. 8, lines 66 and 67, "functioning of the joint" should be -- fusible material --.
Col. 9, line 18, there is a period after "above".
Col. 9, lines 19 and 20, there is a period after "structure".
Col. 9, line 54, there is a period after "level".
Col. 9, line 58, "opening i0" should be -- opening 10 --.
Col. 10, line 6, there is a period after "separate".
Col. 10, line 12, "oap" should be -- cap --.
Col. 10, line 17, after "responsive to", insert -- temperatures inside the tank, and in particular to the fuel --.
Col. 10, line 23, "body 76," should be -- body 76' --.
Col. 10, line 51, there is a period after "removed".

UNITED STATES PATENT AND TRADEMARK OFFICE
CERTIFICATE OF CORRECTION

PATENT NO. : 5,111,837
DATED : May 12, 1992
INVENTOR(S) : John M. Morris, Charles E. Stephens, and Alan K. Forsythe It is certified that error appears in the above-identified patent and that said Letters Patent is hereby corrected as shown below:

Col. 10, line 58, "ageless" should be -- cageless --.
Col. 10, lines 63 and 64, there is a period after "invention".
Col. 11, line 3, there is a period after "situations".
Claim 1, col. 11, line 15, "oonneotor" should be -- connector --.
Claim 2, col. 11, line 40, "claim !" should be -- claim 1 --.
Claim 7, col. 12, line 1, "claim !" should be -- claim 1 --.
Claim 8, col. 12, line 12, "oap" should be -- cap --.
Claim 13, col. 12, line 67, "oap" should be -- cap --.
Claim 14, col. 13, line 3, "oap" should be -- cap --.
Claim 14, col. 14, line 5, after "ring", insert -- of --.

Signed and Sealed this

Twenty-first Day of September, 1993

Attest:

BRUCE LEHMAN

Attesting Officer

Commissioner of Patents and Trademarks